United States Patent
Lin et al.

(10) Patent No.: US 12,053,944 B2
(45) Date of Patent: Aug. 6, 2024

(54) DYEING METHOD FOR FUNCTIONAL CONTACT LENSES

(71) Applicant: MZIONFOCUS INC., Miaoli County (TW)

(72) Inventors: Wen-Ching Lin, Miaoli County (TW); Ching-Fang Lee, Miaoli County (TW); Chi-Ching Chen, Miaoli County (TW); Hsiao-Chun Lin, Miaoli County (TW)

(73) Assignee: VIZIONFOCUS INC., Miaoli County (TW)

( * ) Notice: Subject to any disclaimer, the term of this patent is extended or adjusted under 35 U.S.C. 154(b) by 39 days.

(21) Appl. No.: 17/897,240

(22) Filed: Aug. 29, 2022

(65) Prior Publication Data

US 2024/0066816 A1 Feb. 29, 2024

(51) Int. Cl.
*B29D 11/00* (2006.01)

(52) U.S. Cl.
CPC .. *B29D 11/00048* (2013.01); *B29D 11/00923* (2013.01)

(58) Field of Classification Search
CPC .............. B29D 11/00048; B29D 11/00923
See application file for complete search history.

(56) References Cited

U.S. PATENT DOCUMENTS 4,553,975 A * 11/1985 Su .................. G02B 1/043
8/549

FOREIGN PATENT DOCUMENTS

| EP | 344338 | * 12/1989 |
| GB | 2253919 | * 9/1992 |
| GB | 2298819 | * 9/1996 |

* cited by examiner

*Primary Examiner* — Mathieu D Vargot

(57) ABSTRACT

A dyeing method for functional contact lenses includes the following steps: providing a dry lens body, including hydrogel with 0-90% water content, silicone hydrogel with 0-90% water content, or a combination thereof; preparing an amphoteric polymethyl ether prepolymer, combining the amphoteric polymethyl ether prepolymer with a hydrophilic monomer to form a masking ring material, and attaching the masking ring material to an inner surface of the dry lens body to form a masking ring layer; dropping a colorant onto the inner surface, making the masking ring layer surround the colorant, irradiating the colorant with an ultraviolet light and then heating and fixing the colorant to form a dyed layer on the inner surface; and placing the dry lens body in water to hydrate and removing the masking ring layer to obtain a wet lens body.

10 Claims, 2 Drawing Sheets

DYEING METHOD FOR FUNCTIONAL CONTACT LENSES

FIELD OF THE INVENTION

The present invention relates to a method for dyeing contact lenses, and more particularly to a precise dyeing method for functional contact lenses.

BACKGROUND OF THE INVENTION

Contact lenses have been commercialized for 60 years after invented in the early 1950s. The original contact lenses are made of hard materials such as poly methyl methacrylate (PMMA). Due to its hard material and poor oxygen permeability and hydrophilicity, the contact lens can be worn for a short period of time and has a significant foreign matter discomfort. The contact lenses have a progressive reform when the soft contact lenses were invented in the mid-1970s. The soft contact lenses are made from a water-based hydrogel material such as 2-hydroxyethyl methacrylate (HEMA). Due to its high water absorption, the material forms a soft, high water-containing property after hydration, which greatly enhances the wearing comfort but its oxygen permeability is still low and it can only be worn for 8 to 12 hours a day. Corneal hypoxic edema and neovascularization often occur after prolonged wear. Taiwan has a small territory but big population, and therefore the living space is relatively small and the pressure of school is heavy. As a result, the abnormal population of visual acuity is rapidly increasing. Abnormal vision can be corrected by wearing glasses; however, wearing glasses often causes inconvenience in daily life, so people prefers use contact lenses for vision correction. Contact lenses are worn directly on the cornea and adjacent marginal or scleral areas of the eye to correct vision or as a device for keratoplasty. The development of the product has gradually evolved from the hardest materials such as glass and PMMA to hydrophilic HEMA, and the future development trend is towards the long-lasting silicone hydrogel.

With the development of science and technology, electronic products such as LED lights, tablet computers, TVs, and smart phones release blue light. The eyes may look directly at the blue light emitted by the screen when using 3C products. Blue light is the part of the visible light that is closest to the ultraviolet light, and its wavelength is between 380 nm and 530 nm. The shorter wavelength will be focused in front of the retina in advance, which will cause scattering. Therefore, the eye needs to focus more and cannot relax, and long time looking the screen can easily lead to eye contrast and clarity reduction and increase eye fatigue. Further, blue light is not absorbed by the cornea and the crystal s when it is injected into the eye and can penetrate the cornea and the crystal directly into the macula. If the eye absorbs too much blue light, it will cause stinging, photophobia and other symptoms in the early stage and will cause inflammation and edema of the macula in the long-term, which may form a drusen in the center of the macula. Once the drusen causes bleeding, it will cause central vision defect and cannot seeing things clearly. Therefore, with the changes in modern life and the long-term exposure to blue light, the age group of macular degeneration that often occurred in the elderly has a tendency to decline. Anti-blue light has become an important issue.

The anti-blue-light contact lens commonly known is a kind of anti-blue and anti-UV contact lens disclosed by the Taiwan Patent No. M487455 "Colored contact lens with blue light filtering and anti-UV function", which is composed of upper, middle and lower lenses. The filtering blue light coating agent in the upper lens is used to reduce the blue light penetrating contact lens directly on the eye. The filtering blue light coating agent is not legally added to the contact lens according to the safety scope of the FDA, and there will be doubts that hurt the eyes. Further, adding the filtering blue light coating agent to the contact lens is time consuming, labor intensive and costly and there is no mass production efficiency.

In summer, 380-390 nm ultraviolet light has short wavelength and high energy, and long-term exposure to the sun may cause macular lesions, cataracts, retinopathy, keratitis (light damage) and other injuries. Therefore, a suitable pair of sports sunglasses has become one of the most important equipment for summer sports. The advantage of wearing sunglasses is to prevent the sun from over-irritating the eyes, filtering ultraviolet and infrared rays, avoiding damage to the optic nerve, helping to improve visual contrast sensitivity, reducing reflection glare, and increasing color contrast. Further, wearing sunglasses can help improve problems with eye photophobia, dry eye, early cataract, and conjunctival inflammation. The Taiwan Patent No. 1554803 discloses a method for simplifying the process and consistently producing anti-blue light contact lenses capable of anti-blue light and anti-ultraviolet light. In the method, one or more dyes of yellow, orange, red, green, etc. are adjusted according to the color and the proportion of the dye. Or, the blue light absorber is added to the contact lens hydrogel or the silicon hydrogel monomer. Then, mold molding or spin-forming and other processes are performed. After the dry sheet is solidified, it is thrown into the hydration tank for color fixing and hydration extraction to complete the anti-blue light contact lens. However, this invention is not suitable for high-concentration dyes because it also blocks the UV-visible onset reaction (wavelength 380 nm 400 nm) and cannot be polymerized to form a lens.

Our company's previous invention (Taiwan Patent No. 1697707) therefore provided the following dyeing method and the prepared contact lens. Sports contact lenses use unique light filtering technology, which can block 90% of dazzling blue light and 95% of ultraviolet rays of different wavelengths, which not only effectively reduces the dazzling feeling of light, but also has the function of reducing the degree of visual deformation and highlighting key objects in motion (such as fast moving balls), allowing people to obtain a clearer and brighter view from any angle during exercise. Compared with conventional frame-type sports goggles, wearing sports-specific contact lenses is not only more comfortable and convenient, but also safer. People no longer have to worry about blurred vision due to sweating or accidental eye injuries caused by intense collisions during exercise. People can restore vision faster by wearing the sports-specific contact lenses than wearing the transparent glasses under bright sunlight. In addition, compared with transparent glasses, subjects can obtain better visual recognition by wearing the sports-specific contact lenses in bright sunlight. Compared with transparent glasses, sports-specific contact lenses allow subjects to focus more quickly in bright and shaded conditions. It can be seen from the above that whether it is to make anti-blue light or sports sun contact lenses, the proper selection of dyes/absorbents and dyeing methods are very important.

However, all the iris of the eye will be covered by the dyed dark color lens after wearing the sports-specific contact lenses. The eye color changes and affects the appearance, causing some people to reject this lens, but the real effect of the sports-specific contact lenses is only in the entire pupil range. Therefore, the present invention uses the design of the masking ring to produce the optical zone (pupil zone) to accurately dye the lens, and to obtain a faster, more convenient and more stable dyeing process.

SUMMARY OF THE INVENTION

The present invention provides a dyeing method for functional contact lenses, which can fix reactive dyes on the surface of a lens body, which helps to improve the color uniformity of the appearance of the lens without affecting the color of the iris when the user wears it. In addition, the dyeing method for functional contact lenses of the present invention can accurately control the dyeing range, the shape and the thickness of the dyed layer.

The dyeing method for functional contact lenses provided by the present invention includes the following steps: providing a dry lens body, including hydrogel with 0-90% water content, silicone hydrogel with 0-90% water content, or a combination thereof; preparing an amphoteric polymethyl ether prepolymer, combining the amphoteric polymethyl ether prepolymer with a hydrophilic monomer to form a masking ring material, and attaching the masking ring material to an inner surface of the dry lens body to form a masking ring layer; dropping a colorant onto the inner surface, making the masking ring layer surround the colorant, irradiating the colorant with an ultraviolet light and then heating and fixing the colorant to form a dyed layer on the inner surface; and placing the dry lens body in water to hydrate and removing the masking ring layer to obtain a wet lens body.

In an embodiment of the present invention, the step of attaching the masking ring material to the inner surface of the dry lens body to form the masking ring layer includes a step of: curing and attaching the masking ring material to the inner surface of the dry lens body by pad printing and photopolymerization.

In an embodiment of the present invention, the aforementioned dyeing method for functional contact lenses further includes a step of: placing the wet lens body in a buffer solution and sterilizing.

In an embodiment of the present invention, the step of providing the dry lens body includes a step of: curing hydrogel with 0-90% water content, silicone hydrogel with 0-90% water content, or a combination thereof by ultraviolet light.

In an embodiment of the present invention, a composition of the masking ring material includes: 30-70 wt % polymethyl ether prepolymer, with a molecular weight of 7,000 to 20,000, 30-70 wt % hydrophilic monomer hydrogel, and 0.1-2 wt % ultraviolet light initiator.

In an embodiment of the present invention, the colorant includes: 0.01-5 wt % one or more dyes; 30-45 wt % polymethyl ether prepolymer, with a molecular weight of 7,000 to 20,000, 1-5 wt % one or more alkaline solutions, and 0.1-2 wt % ultraviolet light initiator.

In an embodiment of the present invention, the step of irradiating the colorant with the ultraviolet light and then heating and fixing the colorant to form the dyed layer on the inner surface includes a step of: heating and fixing at 60-70° C. for 20-60 minutes.

In an embodiment of the present invention, the step of placing the dry lens body in water to hydrate includes a step of: immersing the dry lens body in a 60-90° C. aqueous solution for 30-60 minutes.

In an embodiment of the present invention, there is no cross-linking reaction between the masking ring layer and the dry lens body.

In an embodiment of the present invention, an area corresponding to the masking ring layer on the inner surface corresponds to a part of an iris of a user's eye, and the dyed layer corresponds to an optical zone of the user's eye pupil.

In the dyeing method for functional contact lenses of the embodiment of the present invention, by attaching the masking ring material onto the inner surface of the dry lens body to form the masking ring layer, dropping the colorant onto the inner surface, making the masking ring layer surround the colorant, heating and fixing the colorant to form the dyed layer, and placing the dry lens body in the water to hydrate to remove the masking ring layer, the masking ring layer can achieve precise control of the dyeing range, shape and thickness of the dyed layer, which helps to improve the color uniformity of the lens appearance without affecting the color of the iris when the user wears it.

The above and other objects, features, and advantages of the present invention will become more apparent from the description of the preferred embodiments and the accompanying drawings.

DETAILED DESCRIPTION OF PREFERRED EMBODIMENTS

Figure 1:
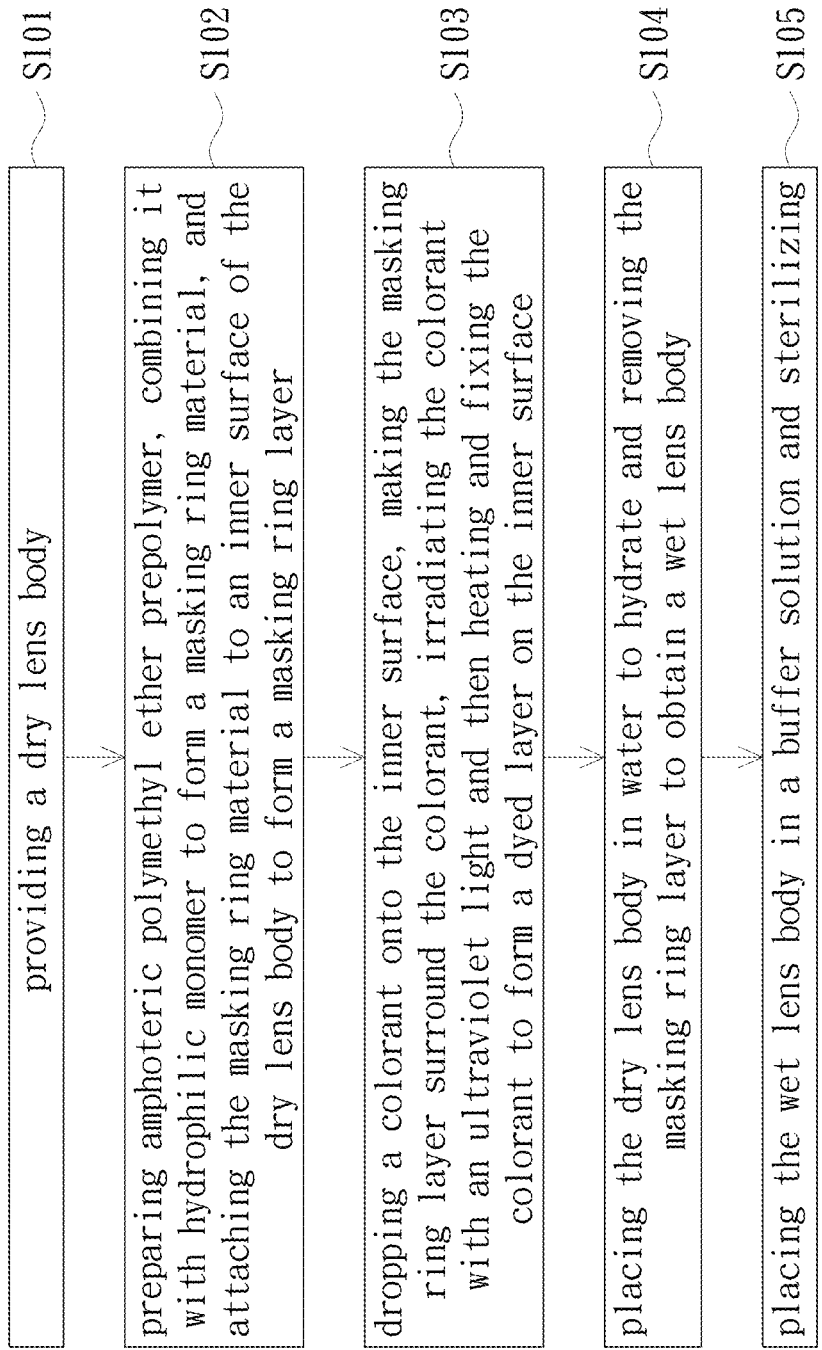
FIG. 1 is a schematic flowchart of a dyeing method for functional contact lenses according to an embodiment of the present invention.

FIG. 1 is a schematic flowchart of a dyeing method for functional contact lenses according to an embodiment of the present invention. Referring to FIG. 1, the dyeing method for functional contact lenses of this embodiment includes the following steps. Step S101: providing a dry lens body, including hydrogel with water content of 0-90%, silicone hydrogel with water content of 0-90%, or a combination thereof. Step S102: preparing amphoteric polymethyl ether prepolymer, combining it with hydrophilic monomer to form a masking ring material, and attaching the masking ring material to an inner surface of the dry lens body to form a masking ring layer. Step S103: dropping a colorant onto the inner surface, making the masking ring layer surround the colorant, irradiating the colorant with an ultraviolet light, and then heating the colorant for color fixing to form a dyed layer on the inner surface. Step S104: placing the dry lens body in water to hydrate and removing the masking ring layer to obtain a wet lens body. Optionally, step S105: placing the wet lens body in a buffer solution and sterilizing.

Material Preparation

Synthesis of Polysiloxane Prepolymer

This embodiment provides a method for preparing amphoteric silicon-containing prepolymer. The amphoteric silicon-containing prepolymer is obtained by using polydimethylsiloxane compound as a raw material for isocyanic acid reaction and then end-capping with hydroxyl monomer. The method for preparing amphoteric silicon-containing prepolymer includes the following steps: performing an isocyanic acid reaction, in which using dihydroxy polydimethylsiloxane compound and isocyanate compound as raw materials, and then adding diluent to react in medium temperature environment to obtain the first product; adding the first product with hydrophilic chain extender (chain extender), and performing terminal hydroxylation reaction and chain extension reaction in turn to obtain the second product: and reacting the second product and the acrylic compound at room temperature for at least 12 hours to obtain amphoteric silicon-containing prepolymer as the third product. The hydrophilic chain extenders are mainly a polyol series, which include ethylene glycol, propylene glycol, 1,4-butanediol, polyethylene glycol, polypropylene glycol, polypropylene glycol diglycidyl ether and the like.

The above embodiment will be described in detail as follows. Take 50 g of dimethyl polysiloxane containing double-terminal hydroxyl groups (trade name KF-6001, purchased from Confucian Chemical Industry Co., Ltd.). Then, add 10 g of isophorone diisocyanate and 0.02 g of dibutyltin dilaurate under nitrogen for reacting under nitrogen at room temperature for 12 hours. Then, add 30 g of polyethylene glycol (weight average molecular weight is 600), 100 g of tetrahydrofuran and 0.02 g of dibutyltin dilaurate for reacting for 24 hours. Then, complete the reaction by confirming the disappearance of the characteristic peak of —NCO at about 2250 cm−1 by infrared absorption spectrum. Then, add 10 g of isophorone diisocyanate and 0.02 g of dibutyltin dilaurate for reacting under nitrogen at room temperature for 24 hours. Then, add 12 g of 2-methyl-2-acrylic acid-2,3-dihydroxypropane ester, 0.02 g of dibutyltin dilaurate for reacting at 60° C. for 24 hours. Then, complete the reaction by confirming the disappearance of the characteristic peak of —NCO at about 2250 cm−1 by infrared absorption spectrum. Thus, the polysilicon with dimethylpolysiloxane as the main structure is obtained, wherein the weight average molecular weight is 11,000-13,000 (identified by GPC).

Synthesis of Polymethyl Ether Prepolymer

This embodiment provides a method for preparing amphoteric polymethyl ether prepolymer. The amphoteric polymethyl ether prepolymer is obtained by using polytetramethylene ether glycol PTMEG 1000 (Polytetramethylene Ether Glycol) as a raw material for isocyanic acid reaction and then end-capping with hydroxyl monomer. The method for preparing amphoteric polymethyl ether prepolymer includes the following steps: performing an isocyanic acid reaction, in which using dihydroxy polydimethylsiloxane compound and isocyanate compound as raw materials, and then adding diluent to react in medium temperature environment to obtain the first product; adding the first product with hydrophilic chain extender (chain extender), and performing terminal hydroxylation reaction and chain extension reaction in turn to obtain the second product: and reacting the second product and the acrylic compound at room temperature for at least 12 hours to obtain amphoteric polymethyl ether prepolymer as the third product. The hydrophilic chain extenders are mainly a polyol series, which include ethylene glycol, propylene glycol, 1,4-butanediol, polyethylene glycol, polypropylene glycol, polypropylene glycol diglycidyl ether and the like.

The above embodiment will be described in detail as follows. Take 50 g of polytetramethylene ether glycol PTMEG 1000 (Polytetramethylene Ether Glycol) as raw material. Then, add 10 g of isophorone diisocyanate and 0.02 g of dibutyltin dilaurate under nitrogen for reacting under nitrogen at room temperature for 24 hours. Then, add 30 g of polyethylene glycol (weight average molecular weight is 600), 100 g of tetrahydrofuran and 0.02 g of dibutyltin dilaurate for reacting for 24 hours. Then, complete the reaction by confirming the disappearance of the characteristic peak of —NCO at about 2250 cm−1 by infrared absorption spectrum. Then, add 10 g of isophorone diisocyanate and 0.02 g of dibutyltin dilaurate for reacting under nitrogen at room temperature for 24 hours. Then, add 12 g of 2-methyl-2-acrylic acid-2,3-dihydroxypropane ester, 0.02 g of dibutyltin dilaurate for reacting at 60° C. for 24 hours. Then, complete the reaction by confirming the disappearance of the characteristic peak of —NCO at about 2250 cm−1 by infrared absorption spectrum. Thus, the polymethyl ether prepolymer is obtained, wherein the weight average molecular weight is 7,000-20,000 (identified by GPC).

In this embodiment, the hydrophilic monomer can be, for example, 2-hydroxyethyl methacrylate (HEMA), N,N-dimethyl acrylamide (DMA), N,N-diethyl acrylamide (DEA), N-vinyl pyrrolidone (NVP), glycerol methacrylate (GMA), polyethylene glycol methacrylate mono methyl ether with a molecular weight of 400, or a combination thereof, but is not limited thereto.

In this embodiment, the ultraviolet light initiator is beneficial to UV light curing, and the content of the ultraviolet light initiator may be 0.1-2 wt %. The ultraviolet light initiator may be, but not limited to, I-1173 (trade name Ciba®IRGACURE®1173) and I-819 (trade name Ciba®IRGACURE®819). In addition, the ultraviolet light initiator can be used alone, or two or more ultraviolet light initiators are used together at the same time. The aforementioned hydrophilic copolymer composition may optionally further include other additives to meet actual needs. The additives that can be used include, but are not limited to, anti-UV absorbers and leveling agents.

According to an embodiment of the present invention, the derivative silicon-containing monomer includes polysiloxane prepolymer, which accounts for 30-80 wt % of the total weight, and the repeating unit of the hydrophilic monomer accounts for 10-50 wt %, and the UV blocking monomer is a monomer with benzotriazole. According to an embodiment of the present invention, the UV blocking monomer accounts for 0.1-1.5 wt % of the total weight of the silicone hydrogel composition, and the ultraviolet light initiator accounts for 0.1-2 wt % of the total weight.

Specifically, add the polysiloxane prepolymer first and stir for about 0.5 to 1.5 hours. Then, add the hydrophilic monomer/initiator and the UV blocking monomer together and continuously stir for about 0.5 to 1.5 hours to obtain the silicone hydrogel composition of the present invention. One aspect of the present invention provides a method for manufacturing a silicone hydrogel lens. The method for manufacturing a silicone hydrogel lens includes the steps of: injecting the silicone hydrogel composition of any of the above embodiments or examples into the mold for preparing the lens; subjecting the silicone hydrogel composition in the mold to UV curing for 30 to 60 minutes to undergo cross-linking and curing reaction to form the silicone hydrogel lens.

The hydrogel materials can be prepared by adding the hydrophilic monomers/initiators and the UV blocking monomers together and continuously stirring for about 0.5 to 1.5 hours. The repeating unit of the hydrophilic monomer accounts for 95-99 wt % and the UV blocking monomer is a monomer with benzotriazole. According to an embodiment of the present invention, the UV blocking monomer accounts for 0.1-1.5 wt % of the total weight of the silicone hydrogel composition, and the ultraviolet light initiator accounts for 0.1-2 wt % of the total weight. Thus, the hydrogel composition of the present invention is obtained.

Preparation of Dry Lens Body of Hydrogel

One aspect of the present invention provides a method for manufacturing a hydrogel lens. The method for manufacturing a hydrogel lens includes the steps of: injecting the hydrogel of any of the above embodiments or examples into the mold for preparing the lens; subjecting the hydrogel composition in the mold to UV curing for 30 to 60 minutes to undergo cross-linking and curing reaction to form a dry lens body. Hydrogel can include any conventional hydrogel ingredients such as: hydroxyl ethyl methacrylate (HEMA), hydroxyl propyl methacrylate (HPMA), methyl methacrylate (MMA), glyceryl methacrylate (GMA), N-vinyl pyrrolidone (NVP), N,N'-dimethylaniline (DMA), N,N'-diethylacrylamide, N-isopropylacrlamide, 2-hydroxyethylacrylamide, vinyl acetate, N-acryloymorpholine, 2-dimethlaminoethyl acrylate, or a combination thereof, but is not limited thereto.

Masking Ring Material and Application

The masking ring layer of this embodiment includes a specially designed masking ring material attached to the inner surface of the dry lens body by pad printing. The "masking ring layer" means a concentric ring design similar to a layer of concentric rings, which leaves the hollow area in the middle for subsequent dyeing process. Specifically, the area corresponding to the masking ring layer on the inner surface is a part of the area corresponding to the iris of the user's eye, and the dyed layer is a hollow area in the middle of the inner surface, which corresponds to the optical zone of the user's eye pupil. The masking ring material includes 30-70 wt % polymethyl ether prepolymer with a molecular weight of about 7,000 to 20,000, 30-70 wt % lens material of hydrophilic monomer hydrogel, and 0.1-2 wt % ultraviolet light initiator.

Masking Ring Material and its Preparing Process

In this embodiment, a preferred method for preparing a colored lens is realized by pad-printing as described below. First, provide a metal plate covered with a photoresist material, wherein the metal plate is preferably made of steel or more preferably made of stainless steel, and the photoresist material becomes insoluble in water once it is cured. Then, select or design the pattern and inner and outer diameters of the masking ring, and then use any one of techniques (e.g., photography) to reduce it to the desired size, place it on the metal plate, and then cure the photoresist material. The conditions for performing pattern etching are known to those having ordinary knowledge in the technical field to which the present invention pertains. Then, wash the metal plate with an aqueous solution after the pattern is formed, and etch the resulting image onto the metal plate to a suitable depth (e.g., about 10-20 microns) with an inner diameter of 4-8 mm and an outer diameter of 6-14 mm Thus, the width of the masking ring is about 2-10 mm.

The process first deposits the masking ring material on the filling recesses on the image, then scrapes the excess material with a scraper, and then uses a silicone head with a suitable geometric shape and varying hardness (usually about 10 Shore, a durometer unit) to squeeze the masking ring material for the image on the metal plate, and then squeezes and transfers the masking ring material to the inner surface of the dry lens body. The masking ring that is pad-printed is polymerized and molded with an ultraviolet light initiator, and it is completely cured and attached to the inner surface of the dry lens body. It should be understood that although the masking ring layer is attached to the inner surface of the dry lens body, there is no cross-linking reaction between the masking ring layer and the dry lens body. Therefore, the masking ring layer can be removed by other subsequent processing, and the final lens body product, for example, will not have the masking ring layer.

Colorant and Application

In this embodiment, the colorant includes one or more dyes and one or more alkaline solutions. The dye is, for example, an organic dye, which includes reactive dye, xylylene blue dye, xylylene green dye, oxazole violet, vate orange #1, etc., and combinations thereof, but is not limited thereto. Specifically, the colorant includes 0.01-5 wt % one or more dyes, 30-45 wt % polymethyl ether prepolymer with a molecular weight of about 7,000 to 20,000, 1-5 wt % one or more alkaline solutions, and 0.1-2 wt % ultraviolet light initiator. The alkaline solution can be any alkaline compound such as NaOH, KOH, NaCO$_3$, NaHCO$_3$, triethylamine (TEA) or ethanolamine (ETA). The colorant is dropped onto the inner surface of the dry lens body and is dropped into the inner diameter of the masking ring layer. After the colorant is formed into a gel state after 1-10 minutes of ultraviolet light polymerization, it is then heated and fixed at 60-70° C. for 20-60 minutes. Reactive dyes are azo reactive dyes, non-toxic and meet the requirements of contact lens preparation, and have passed the US Food and Drug Administration (FDA) regulations, such as Reactive Blue 21, Reactive Blue No 19, Reactive Yellow 15, Reactive Orange 78, Reactive Black 5, CI Reactive Yellow 86, CI Reactive Red 11, CI Reactive Red 180, CI Reactive Blue163, etc., but not limited thereto. Reactive dyes are also water-soluble dyes with active groups on the molecular structure, which can covalently bond or hydrogen bond with the hydroxyl, amino, and carboxyl hydroxyl groups on the contact lens material. For vinyl chloride-based reactive dyes, the active group contained in it is vinyl chloride (D-SO$_2$CH=CH$_2$) or β-hydroxyethyl sulfate. During dyeing, β-hydroxyethyl sulfonate undergoes elimination reaction to generate vinyl sulfide group in alkaline medium, and then undergoes nucleophilic addition reaction with polymer hydroxyl or amino group to form a covalent bond. The solution composed of reactive dyes can contain one or more reactive dyes.

The above dyed dry lens body is put into water for hydration, and the water used is preferably RO water. Specifically, after immersing in a 60-90° C. aqueous solution for 30-60 minutes, the dry sheet can completely absorb water and swell, and remove the hydrogel or dye residue that has not undergone cross-linking curing reaction. At this time, because the masking ring layer is only attached to the surface, there is no cross-linking reaction between the masking ring layer and the dry lens body, and the masking ring layer will be removed together, so that a functional contact wet lens with stable and concentrated dyeing in the optical zone can be obtained. Finally, optionally place the above functional contact wet lens in a buffer of phosphoric acid or boric acid saline with a pH of 7.1-7.5 for high temperature and high pressure sterilization.

The reactive dye can form a covalent bond with the hydroxyl group, amino group, and carboxyl hydroxyl group of the lens body to be fixed to the lens body. The method of dyeing after alkali also helps to increase the fixation rate of reactive dyes and reduce the release of reactive dyes. The reactive dye bonded to the lens can absorb light in a specific wavelength range. Preferably, the specific wavelength range is in the blue wavelength range. Therefore, when visible light enters the dyed lens, the light with the specific wavelength is absorbed and blocked by the lens, and the amount of penetration through the lens is reduced.

It should be noted that although the reactive dye enters the lens body from the surface of the lens, the part of the lens body where the reactive dye is fixed is mainly the surface part. It is preferable that the reactive dye does not penetrate into the interior of the lens body. Based on the different degrees of the reactive dyes entering the lens body, the dyed layer can have different thicknesses. The extent to which the reactive dye enters the lens body and the thickness of the dyed layer can be adjusted through the concentration of the ion salt solution, the osmotic pressure, the concentration of the reactive dye, and the alkali concentration. The thickness of the dyed layer can be determined based on the type of reactive dye and the desired light absorption effect.

Figure 2A:
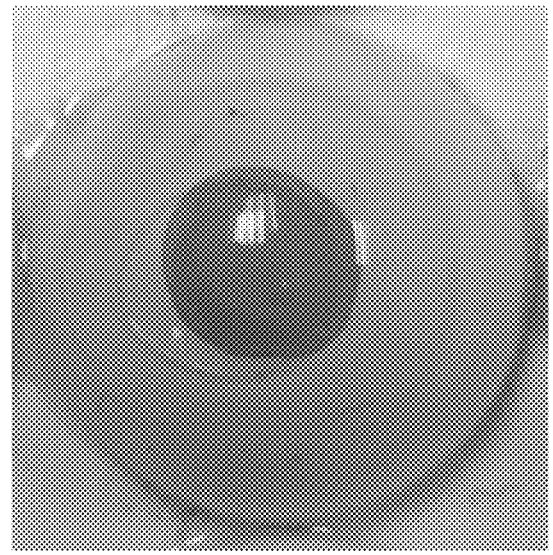
FIGS. 2A and 2B are schematic diagrams of the finished product of the functional contact lens according to an embodiment of the present invention.
Figure 2B:
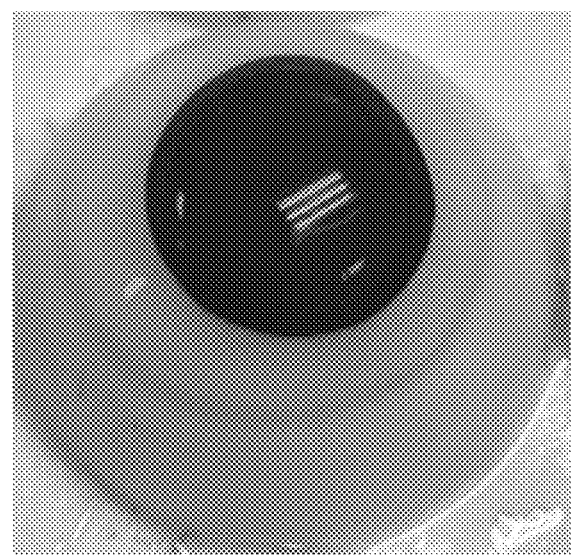

FIGS. 2A and 2B are schematic diagrams of the finished product of the functional contact lens according to an embodiment of the present invention. In FIGS. 2A and 2B, the schematic diagrams are photos taken under an optical microscope at 20× magnification, the colored area is the area of the dyed layer, and this area also corresponds to the optical zone of the user's eye pupil. It can be seen from FIGS. 2A and 2B that the contour between the edge of the dyed layer and the inner surface of the dry lens body is clear, and there is no edge blurring. This is because in the dyeing method of the functional contact lens of the embodiment of the present invention, the masking ring material is attached to the inner surface of the dry lens body to form a masking ring layer (not shown). Then the colorant is dropped onto the inner surface, the masking ring layer surrounds the colorant, and the colorant is heated for color fixing to form a dyed layer. Finally, the dry lens body is put in the water to hydrate to remove the masking ring layer. Through the masking ring layer, the area size (the dyed layer in FIG. 2A is smaller, and the dyed layer in FIG. 2B is larger), shape, color, and thickness of the dyed layer can be accurately controlled, which helps to improve the color uniformity of the lens appearance without affecting the color of the iris when the user wears it.

In the conventional dyeing method, it is generally difficult to accurately control the area size of the dyed layer when dyeing a wet film, and therefore it is easy to dye the entire lens body. In addition, the dyeing of dry film requires the cooperation of the mold, that is, when the size, shape, color or thickness of the dyed layer need to be adjusted, it is necessary to replace with a new mold or holder to achieve the desired effect. The cost is too high and it is difficult to mass produce. Compared with the dyeing method in the prior art, the functional contact lens manufactured by the dyeing method of functional contact lens of the embodiment of the present invention only needs to simply adjust the masking ring layer to precisely control the area size, shape, color, and thickness of the dyed layer. Thus, not only the production process is simple, cost-saving, but also suitable for large-scale mass production.

The above is only the preferred embodiment of the present invention, and the scope of the present invention is not limited thereto. That is, the simple equivalent change and modifications according to the scope of the present invention and the description of the invention are still within the scope of the invention patent. In addition, any of the objects or advantages or features of the present invention are not required to be achieved by any embodiment or application of the invention. In addition, the Abstract and Title are only used to assist in the search of patent documents and are not intended to limit the scope of the invention. In addition, the terms "first" and "second" as used in the specification or the scope of the patent application are used only to name the elements or to distinguish different embodiments or ranges, and are not intended to limit the upper or lower limit number of elements.

What is claimed is:

1. A dyeing method for functional contact lenses, the dyeing method comprising steps of:
   providing a dry lens body, comprising non-silicone hydrogel, silicone hydrogel, or a combination thereof;
   preparing an amphoteric polymethyl ether prepolymer, combining the amphoteric polymethyl ether prepolymer with a hydrophilic monomer to form a masking ring material, and attaching the masking ring material to an inner surface of the dry lens body to form a masking ring layer;
   dropping a colorant onto the inner surface, making the masking ring layer surround the colorant, irradiating the colorant with an ultraviolet light and then heating and fixing the colorant to form a dyed layer on the inner surface; and
   placing the dry lens body in water to hydrate in order to remove the masking ring layer and then obtain a wet lens body.

2. The dyeing method for functional contact lenses according to claim 1, wherein the step of attaching the masking ring material to the inner surface of the dry lens body to form the masking ring layer comprises a step of: pad printing and then letting the masking ring material be polymerized and molded with ultraviolet light initiator.

3. The dyeing method for functional contact lenses according to claim 1, further comprising a step of: placing the wet lens body in a buffer solution and sterilizing.

4. The dyeing method for functional contact lenses according to claim 1, wherein the step of providing the dry lens body comprises a step of: curing non-silicone hydrogel, silicone hydrogel, or a combination thereof by ultraviolet light.

5. The dyeing method for functional contact lenses according to claim 1, wherein a composition of the masking ring material comprises:
   30-70 wt % polymethyl ether prepolymer, with a molecular weight of 7,000 to 20,000;
   30-70 wt % hydrophilic monomer hydrogel; and
   0.1-2 wt % ultraviolet light initiator.

6. The dyeing method for functional contact lenses according to claim 1, wherein the colorant comprises:
   0.01-5 wt % one or more dyes;
   30-45 wt % polymethyl ether prepolymer, with a molecular weight of 7,000 to 20,000;
   1-5 wt % one or more alkaline solutions; and
   0.1-2 wt % ultraviolet light initiator.

7. The dyeing method for functional contact lenses according to claim 1, wherein the step of irradiating the colorant with the ultraviolet light and then heating and fixing the colorant to form the dyed layer on the inner surface comprises a step of: heating and fixing at 60-70° C. for 20-60 minutes.

8. The dyeing method for functional contact lenses according to claim 1, wherein the step of placing the dry lens body in water to hydrate comprises a step of: immersing the dry lens body in a 60-90° C. aqueous solution for 30-60 minutes.

9. The dyeing method for functional contact lenses according to claim 1, wherein there is no cross-linking reaction between the masking ring layer and the dry lens body.

10. The dyeing method for functional contact lenses according to claim 1, wherein an area corresponding to the masking ring layer on the inner surface corresponds to a part of an iris of a user's eye, and the dyed layer corresponds to an optical zone of the user's eye pupil.

* * * * *